(12) United States Patent
Williams et al.

(10) Patent No.: US 9,608,424 B2
(45) Date of Patent: Mar. 28, 2017

(54) WILDLIFE PROTECTIVE COVER HAVING A CONDUCTOR/INSULATOR GUARD AND SYSTEM FOR POWER DISTRIBUTION AND TRANSMISSION SYSTEMS AND RELATED METHODS

(71) Applicant: Marmon Utility, LLC, Milford, NH (US)

(72) Inventors: Michael L. Williams, Newburyport, MA (US); Charles J. Clement, Pelham, NH (US); Guberson Mercedat, North Andover, MA (US); Gary C. Grenier, New Boston, NH (US)

(73) Assignee: Marmon Utility, LLC, Milford, NH (US)

( * ) Notice: Subject to any disclaimer, the term of this patent is extended or adjusted under 35 U.S.C. 154(b) by 218 days.

(21) Appl. No.: 14/514,839

(22) Filed: Oct. 15, 2014

(65) Prior Publication Data

US 2016/0111863 A1    Apr. 21, 2016

(51) Int. Cl.
  *B25G 1/00*    (2006.01)
  *H02G 7/00*    (2006.01)

(52) U.S. Cl.
  CPC .................................... *H02G 7/00* (2013.01)

(58) Field of Classification Search
  CPC .. H02G 7/00; H02G 7/05; H02G 7/12; H02G 7/20; H02G 15/117; H02G 7/06; H02G 15/22; H02G 15/20; H02G 15/02; H02G 15/06; H02G 9/00; H02G 9/10; H02G 7/02; H02G 7/08; H02G 7/15; H02G 7/18; H02G 3/081; H02G 3/14; H01R 4/66; H01B 7/00; H01B 17/34; H01B 17/36; H01B 7/1855; H01B 7/186; H01B 7/1865; H01B 7/187; H01B 7/1875; H01B 3/00; H01B 3/30; H01B 3/305; H01B 3/306; H01B 3/308; H01B 3/32; H01B 3/42; H01B 3/421; H01B 3/422; H01B 3/423; H01B 3/425;
  (Continued)

(56) References Cited

U.S. PATENT DOCUMENTS 1,485,994 A * 3/1924 Salisbury ................. H02G 7/00
                                                138/128
2,205,039 A * 6/1940 Johns ....................... H02G 7/00
                                                174/136

(Continued)

*Primary Examiner* — Angel R Estrada
*Assistant Examiner* — Pete Lee
(74) *Attorney, Agent, or Firm* — Hayes Soloway PC

(57) ABSTRACT

A conductor cover apparatus for use with an overhead electrical transmission and distribution system and related methods is provided. The conductor cover apparatus has a center cover member. At least one arm connector is formed on the center cover member, the at least one arm connector having an opening and a first hole positioned between a first external side and a second external side of the at least one arm connector. An extension arm is positioned at least partially interior of the first and second external sides of the at least one arm connector. At least one pin is removably connecting the extension arm to the at least one arm connector, wherein the at least one pin is positioned through the first hole of the at least one arm connector and a first arm hole within the extension arm.

20 Claims, 12 Drawing Sheets

(58) Field of Classification Search
CPC . H01B 3/44; H01B 3/46; H01B 17/00; H01B 1/00; H01B 17/06; H01B 17/16; H01B 17/22; H01B 17/58; H01B 17/38; H02B 1/28; H05K 5/00; E04H 12/24; H01L 23/48
USPC ........ 174/42, 43, 44, 45 TD, 40 CC, 40 TD, 174/45 R, 138 R, 138 G, 168, 154, 161 R; 248/61
See application file for complete search history.

(56) References Cited

U.S. PATENT DOCUMENTS

| | | | | |
|---|---|---|---|---|
| 2,871,282 A * | 1/1959 | Tipsord | ................... | H02G 7/00 |
| | | | | 174/136 |
| 3,900,697 A * | 8/1975 | Yotsugi | ................... | H01B 7/24 |
| | | | | 174/136 |
| 6,730,852 B1 * | 5/2004 | Puigcerver | ............. | H01B 17/58 |
| | | | | 174/138 F |
| 7,842,885 B2 * | 11/2010 | Calleja | ................... | F21V 21/35 |
| | | | | 174/68.1 |
| 8,907,222 B2 * | 12/2014 | Stransky | ................ | H01B 17/00 |
| | | | | 174/137 R |
| 8,963,011 B2 * | 2/2015 | Lynch | ...................... | H02G 7/05 |
| | | | | 174/168 |
| 9,362,028 B2 † | 6/2016 | Behnken | | |
| 2013/0264097 A1 | 10/2013 | Lynch | | |
| 2013/0299230 A1 † | 11/2013 | Lynch | | |
| 2014/0034380 A1 | 2/2014 | Lynch | | |
| 2015/0107892 A1 * | 4/2015 | Lynch | ................... | H01B 17/56 |
| | | | | 174/55 B |

\* cited by examiner
† cited by third party

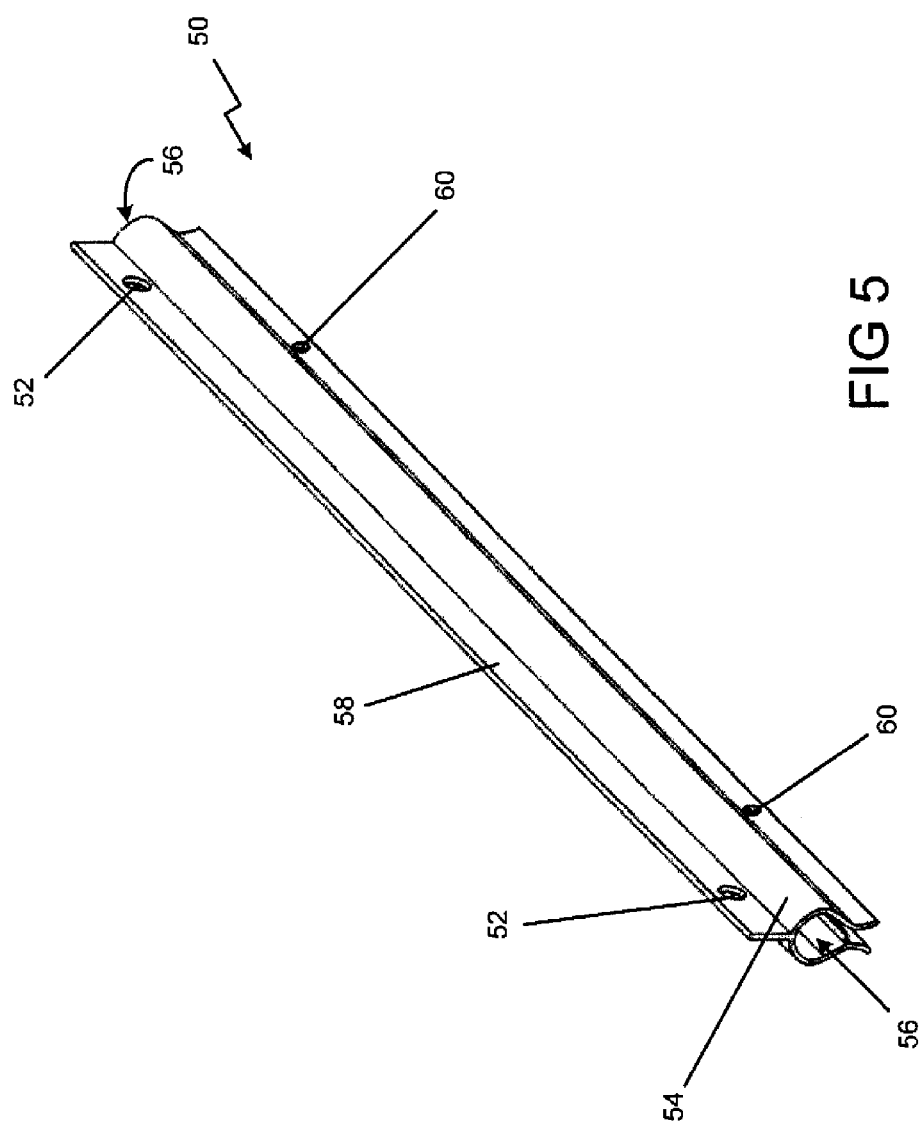

100

┌─────────────────────────────────────────────────────┐
│ An electrical transmission and distribution conductor, where affixed to │
│ an insulator, is shielded from a vertical position with a center cover │ — 102
│ member │
└─────────────────────────────────────────────────────┘
                             │
┌─────────────────────────────────────────────────────┐
│ A portion of an electrical transmission and distribution conductor affixed │
│ to an insulator is shielded from the vertical position with at least one arm │
│ connector formed on the center cover member, the at least one arm │
│ connector having an opening and a first hole positioned between a first │ — 104
│ external side and a second external side of the at least one arm │
│ connector, and an extension arm positioned at least partially interior of │
│ the first and second external sides of the at least one arm connector, │
│ wherein the extension arm is movably connected to the at least one arm │
│ connector with at least one pin, wherein the at least one pin is positioned │
│ through the first hole of the at least one arm connector and a second hole │
│ within the extension arm │
└─────────────────────────────────────────────────────┘

FIG 13

WILDLIFE PROTECTIVE COVER HAVING A CONDUCTOR/INSULATOR GUARD AND SYSTEM FOR POWER DISTRIBUTION AND TRANSMISSION SYSTEMS AND RELATED METHODS

FIELD OF THE DISCLOSURE

The present disclosure is generally related to power distribution and transmission conductors and insulator devices and more particularly is related to wildlife protective covers having a conductor/insulator guard and systems for power distribution and transmission systems and related methods.

BACKGROUND OF THE DISCLOSURE

Utility poles are widely used to mount electrical wire conductors above ground for the distribution of electrical power to rural or urban areas. The conductors are secured on an isolative body, called an insulator, typically installed on a cross arm support firmly connected to the pole. The bare conductor is secured to the insulator either via a tie-wire if a tie-top type insulator is used or via a clamping mechanism if a clamp-top insulator is used, such as, the vise-top insulators.

In recent years, utility companies have become more sensitive to wildlife protection, particularly birds, since the utility pole offers itself as an ideal resting or nesting support for migrating or local birds respectively. The animal can be in contact with either the conductor, the insulator, or the cross arm. However, the danger lies during landing or take-off whereof the wingspan of such birds can be sufficiently wide to bridge two energized lines or a live line to ground (insulator pins, metal poles etc.) causing an electrical short, killing or injuring the bird and causing power outages to consumers. Protective covers installed on the conductor at the interface to utility pole structures in the distribution and transmission system have proven to reduce the risk of electrocution to wildlife.

Various conventional wildlife covers are currently available on the market and are designed to fit different types and sizes of insulators and conductors. However, these conventional devices have many weaknesses, including the following:

1. Angled construction limitations: some conventional covers are manufactured to specific fixed angle values limiting the use of such cover to only pre-determined angles. Other devices only allow horizontal angled movement. Other products depend on the material's flexibility to accommodate angled constructions which causes detrimental distortion to the cover standalone shape. Consequently, bending the flexible material of the device over time may cause mechanical fatigue to the flexed area and weakens the material which can compromise the cover's mechanical and electrical performances.
2. Conductor sagging angle: some conventional covers on the market are not designed to accommodate for the conductor's different sagging angles which depend primarily on the line tension and on the surrounding air temperature variations. Rather, their use is limited by either the sloppiness of the assembly or by the flexibility of the material which can provide a limited sagging angle but still stresses the material overtime.
3. Conductor size dependency: some conventional covers are conductor size dependent. They can accommodate a specific range of conductor sizes since the cover assembly depends on the conductor to be firmly secured in order to resist wind forces, snow and animal weights. This increases the number of different size covers to be carried by utility companies which is very undesirable.
4. Neck Size dependency: Some cover designs use the insulator's neck diameter to remain securely attached to the insulator. Consequently, different cover sizes have to be carried by utility companies which can be expensive and inefficient.
5. Different elevations between poles: most conventional covers on the market do not account for poles at different elevations coupled with the conductor sagging angles. As a result, the covers may be forcibly bent causing unnecessary mechanical stress on the assembly and rendering it vulnerable to dislodging in rough conditions, such as windy or snowy conditions when the conductor is prone to galloping and swinging.
6. Flexible material: covers made with flexible material are relatively thin and tend to rotate and/or lift in windy conditions, exposing the insulator. This exposing of the insulator may allow the animal to use it for resting or nesting space. Also, thin covers are more susceptible to electrical puncture due to the thickness, abrasion and material fatigue overtime.
7. Need a special accessory for use with alive-line tool (a.k.a. hot stick): some conventional cover devices require special attachments to the hot stick, the insulated pole used to contact live conductors, in order to install the wildlife cover on the insulator and the bare conductor. An additional accessory is an extra tool the linemen have to carry.
8. Pre-assembly needed: some conventional cover devices require pre-assembly before mounting them on the insulator and the bare conductor.
9. Extension arm length limitation: most conventional wildlife cover devices on the market are offered with pre-determined extension arm lengths for covering the exposed bare conductor, primarily due to the manufacturing process limitations.
10. Electrical characteristics: some conventional cover devices provide a physical barrier but the barrier has limited electrical-withstand performance. Holes, gaps, or seams in the cover assemblies can provide a short arc path from the conductor that can result in electrocutions, especially in wet conditions.

Thus, a heretofore unaddressed need exists in the industry to address the aforementioned deficiencies and inadequacies.

SUMMARY OF THE DISCLOSURE

Embodiments of the present disclosure provide a conductor cover apparatus for use at the conductor—insulator interface in an overhead electrical transmission and distribution system. Briefly described, in architecture, one embodiment of the system, among others, can be implemented as follows. The conductor cover apparatus has a center cover member. At least one arm connector is formed on the center cover member, the at least one arm connector having an opening and a first hole positioned between a first external side and a second external side of the at least one arm connector. An extension arm is positioned at least partially interior of the first and second external sides of the at least one arm connector. At least one pin is removably connecting the extension arm to the at least one arm connector, wherein the at least one pin is positioned through the first hole of the at least one arm connector and a second hole within the extension arm.

The present disclosure can also be viewed as providing a system for shielding overhead electrical transmission and distribution components from wildlife contact. Briefly described, in architecture, one embodiment of the system, among others, can be implemented as follows. An electrical transmission and distribution conductor is affixed to an insulator. A center cover member shields a conductor—insulator interface from a vertical position. At least one arm connector is formed on the center cover member, the at least one arm connector having an opening and a first hole positioned between a first external side and a second external side of the at least one arm connector, wherein the at least one arm connector at least partially shields a first portion of the electrical transmission and distribution conductor from the vertical position. An extension arm is positioned at least partially interior of the first and second external sides of the at least one arm connector, wherein the extension arm at least partially shields a second portion of the electrical transmission and distribution conductor from at least the vertical position. At least one pin is removably connecting the extension arm to the at least one arm connector, wherein the at least one pin is positioned through the first hole of the at least one arm connector and a second hole within the extension arm.

The present disclosure can also be viewed as providing a method of shielding overhead electrical transmission and distribution components from wildlife contact. In this regard, one embodiment of such a method, among others, can be broadly summarized by the following steps: shielding an electrical transmission and distribution conductor—insulator interface from a vertical position with a center cover member; and shielding a portion of an electrical transmission and distribution conductor affixed to an insulator from the vertical position with at least one arm connector formed on the center cover member, the at least one arm connector having an opening and a first hole positioned between a first external side and a second external side of the at least one arm connector, and an extension arm positioned at least partially interior of the first and second external sides of the at least one arm connector, wherein the extension arm is movably connected to the at least one arm connector with at least one pin, wherein the at least one pin is positioned through the first hole of the at least one arm connector and a second hole within the extension arm.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is an isometric view illustration of the extension arm of the conductor cover apparatus of FIG. 1, in accordance with the first exemplary embodiment of the present disclosure.

FIG. 13 is a flowchart illustrating a method of shielding overhead electrical transmission and distribution components from wildlife contact, in accordance with the first exemplary embodiment of the present disclosure.

DETAILED DESCRIPTION

Figure 1:
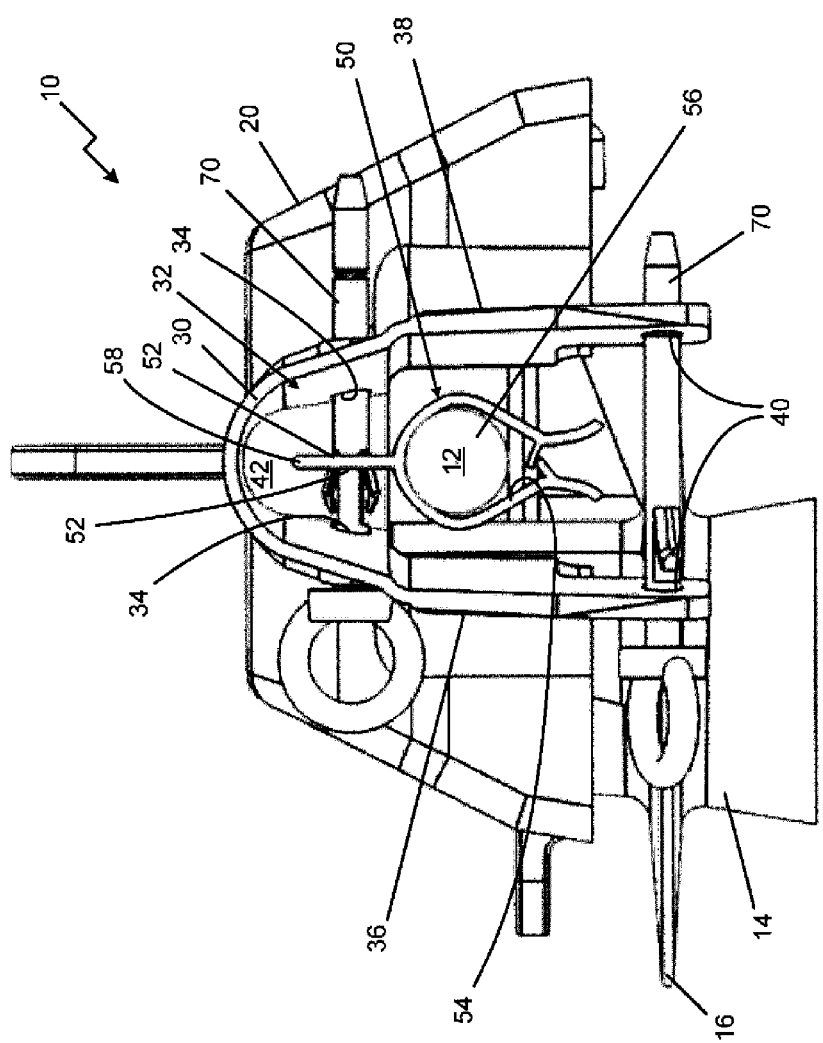
FIG. 1 is a side view illustration of a conductor cover apparatus, in accordance with a first exemplary embodiment of the present disclosure.

FIG. 1 is a side view illustration of a conductor cover apparatus 10 for use with an overhead electrical transmission and distribution system, in accordance with a first exemplary embodiment of the present disclosure. The conductor cover apparatus 10 for use with an overhead electrical transmission and distribution system which may be referred to herein as 'apparatus 10', includes a center cover member 20. At least one arm connector 30 is formed on the center cover member 20, the at least one arm connector 30 having an opening 32 and a first hole 34 positioned between a first external side 36 and a second external side 38 of the at least one arm connector 30. An extension arm 50 is positioned at least partially interior of the first and second external sides 36, 38 of the at least one arm connector 30. At least one pin 70 is removably connecting the extension arm 50 to the at least one arm connector 30, wherein the at least one pin 70 is positioned through the first hole 34 of the at least one arm connector 30 and a first arm hole 52 within the extension arm 50.

The apparatus 10 may be used with overhead electrical transmission and distribution systems which utilize overhead utility support structures, such as utility poles and utility towers, which carry an electrical transmission and distribution conductor 12 (hereinafter, "conductor 12"). The conductor 12 may include a variety of wire sizes, constructions and materials. The conductor 12 may be affixed to a cross arm of the utility support structure with an isolative body, such as an insulator 14, affixed to the utility support structure. While a variety of insulators 14 may be available in the art, a universal vise-top insulator, as described in detail in U.S. patent application Ser. No. 13/895,934 and depicted in FIG. 1, may be routinely used. The vise-top insulator has an insulator body that is formed about a central axis and has a plurality of skirts 16 positioned about the body. A vise structure at a top or side of the body can be used to retain the conductor 12 to the insulator, and thus, to the utility support structure.

The center cover member 20 may be a substantially unitary structure which is capable of fitting over all or a portion of the insulator 14, or at least the portion of the insulator 14 which carries the conductor 12. As described in detail relative to FIGS. 3-4, the center cover member 20 may have an interior cavity which receives a portion of the insulator 14 therein, allowing the center cover member 20 to sit on top of the insulator 14. The specific shape or dimensions of the center cover member 20 may vary depending on the insulator 14 size, shape, or features, among other considerations. For example, the center cover member 20 may be designed to fit insulators 14 with varying sizes and shapes, including those with tie-top, trunnion top, clamp-top, or other types of conductor end fittings, all of which may have different sizes and shapes. The center cover member 20 may shield the conductor 12 and proximate portions of the insulator 14 from external contact, namely, contact from wildlife. For example, the center cover member 20 may shield avian or tree-dwelling rodent wildlife that land or perch on distribution and transmission systems from contacting directly the conductor—insulator interface or the portions of the conductor 12 proximate to the insulator 14. As is shown in FIG. 1, the center cover member 20 may be positioned on the insulator 14 without touching the skirt 16 and compromising its electrical performance.

The at least one arm connector 30 may be formed on the center cover member 20, such as on a side of the center cover member 20, such that the arm connector 30 extends laterally from the insulator 14 when the center cover member 20 is positioned on the insulator 14. In this position, the arm connector 30 may be capable of aligning with a conductor 12 which also extends substantially laterally from the insulator 14. Commonly, the center cover member 20 may include two opposing arm connectors 30, but any number of arm connectors 30 may be used with a single center cover member 20. The arm connector 30 may include an inverted U-shape which extends from the center cover member 20 and terminates at the opening 32 which is positioned a distance from the center cover member 20. The portion of the arm connector 30 that is near the opening 32 may be flared, as described in detail relative to FIG. 3. The arm connector 30 may be located substantially above and to the sides of the conductor 12 when the center cover member 20 is positioned on the insulator 14.

The arm connector 30 may have a variety of holes positioned therein. For instance, the arm connector 30 may include the first hole 34 positioned between a first external side 36 and a second external side 38 of the at least one arm connector 30. Each of the first and second external sides 36, 38 may be characterized as an external or outermost surface of the arm connector 30. The first hole 34 may be positioned entirely through the arm connector 30, as is shown in FIG. 1, such that the pin 70 may be positioned through the arm connector 30, between the first and second external sides 36, 38, e.g., through each sidewall of the arm connector 30. The arm connector 30 may also include a second hole 40 positioned on a lower portion of the arm connector 30 which permits insertion of another pin 70 through the arm connector 30, between the first and second external sides 36, 38. A vertical wall 42 may be positioned within the arm connector 30 to provide a stop for the extension arm 50 when it is positioned on the conductor 12 and inserted into the arm connector 30.

An extension arm 50 may be used with each arm connector 30 within the apparatus 10. The size and shape of the extension arm 50 may vary depending on its intended use, but it is envisioned that the extension arm 50 will be capable of accommodating all power distribution bare conductors having a diameter of up to 1.2". The length of the extension arm 50 may be pre-cut or field customized for the application. The extension arm 50 may be positioned at least partially interior of the first and second external sides 36, 38 of the at least one arm connector 30, such that the arm connector 30 substantially covers the portion of the extension arm 50 that is positioned interior of the opening 32. The extension arm 50 may include a body 54 having a conductor channel 56 and a vertical ridge 58 connected to the top of the body 54, wherein the extension arm 50 can be securely fit around and cover the conductor 12, as described in detail relative to FIGS. 5-8. The extension arm 50 is also removably connectable to the arm connector 30 with the pin 70 positioned through the first hole 34 of the arm connector 30. The pin 70 may be connected to the extension arm 50 through first arm hole 52 which is positioned in the vertical ridge 58. Thus, the pin 70 is capable of removably connecting the extension arm 50 to the arm connector 30 through the first hole 34 of the arm connector 30 and the first arm hole 52 within the extension arm 50.

The removable connection or joint formed between the arm connector 30 and the extension arm 50 using the pin 70 positioned through the first hole 34 of the arm connector 30 and the first arm hole 52 of the extension arm 50 may allow for movement or positioning of the extension arm 50 relative to the arm connector 30 and the center cover member 20. For example, the joint formed by pin 70 may allow for extension arm 50 to be moved to misaligned positions relative to the arm connector 30, such as misalignments of up to or beyond 30°, as measured between an elongated axis of the extension arm 50 and an elongated axis of the arm connector 30, radially or 360° about the conductor 12. This ability for angular positioning between the extension arm 50 and the arm connector 30 may allow the apparatus 10 to be successfully used with overhead electrical transmission and distribution systems with angular conductor paths in both horizontal and vertical directions. Additionally, the apparatus 10 may be capable of successfully shielding the insulator 14 and conductor 12 throughout movement of the conductor 12 such as during inclement weather without damage to the apparatus 10. The benefits and uses of the apparatus 10 are further described herein relative to FIGS. 2-13.

Figure 2:
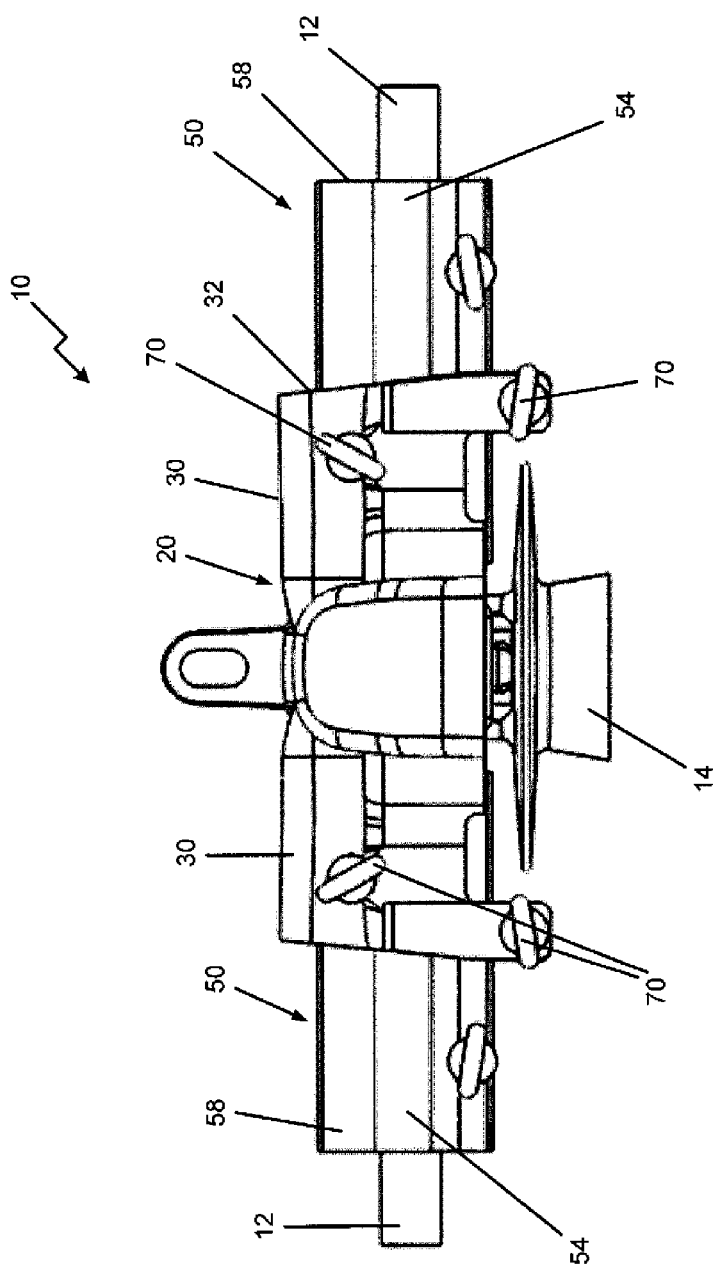
FIG. 2 is a front view illustration of the conductor cover apparatus of FIG. 1, in accordance with the first exemplary embodiment of the present disclosure.

FIG. 2 is a front view illustration of the insulator cover apparatus 10 of FIG. 1, in accordance with the first exemplary embodiment of the present disclosure. In particular, FIG. 2 depicts the apparatus 10 with the center cover member 20 and two extension arms 50 installed on a universal vise-top insulator 14. The conductor 12 is retained by the insulator 14 with the center cover member 20 and arm connectors 30 positioned over the insulator 14 and the portions of the conductor 12 that are proximate to the insulator 14. The extension arms 50 are positioned covering the conductor 12 from a point along the conductor 12 interior of the opening 32 of the arm connector 30 to a distance along the conductor 12 remote from the insulator 14, anywhere from two inches to 10 feet or more away from the insulator 14. The overall configuration of the apparatus 10 allows for the conductor 12 to be shielded from a vertical position, a position from where wildlife would likely touch the conductor 12, along all portions of the conductor 12 that are near the insulator 14, and from other positions as well.

Figure 3:
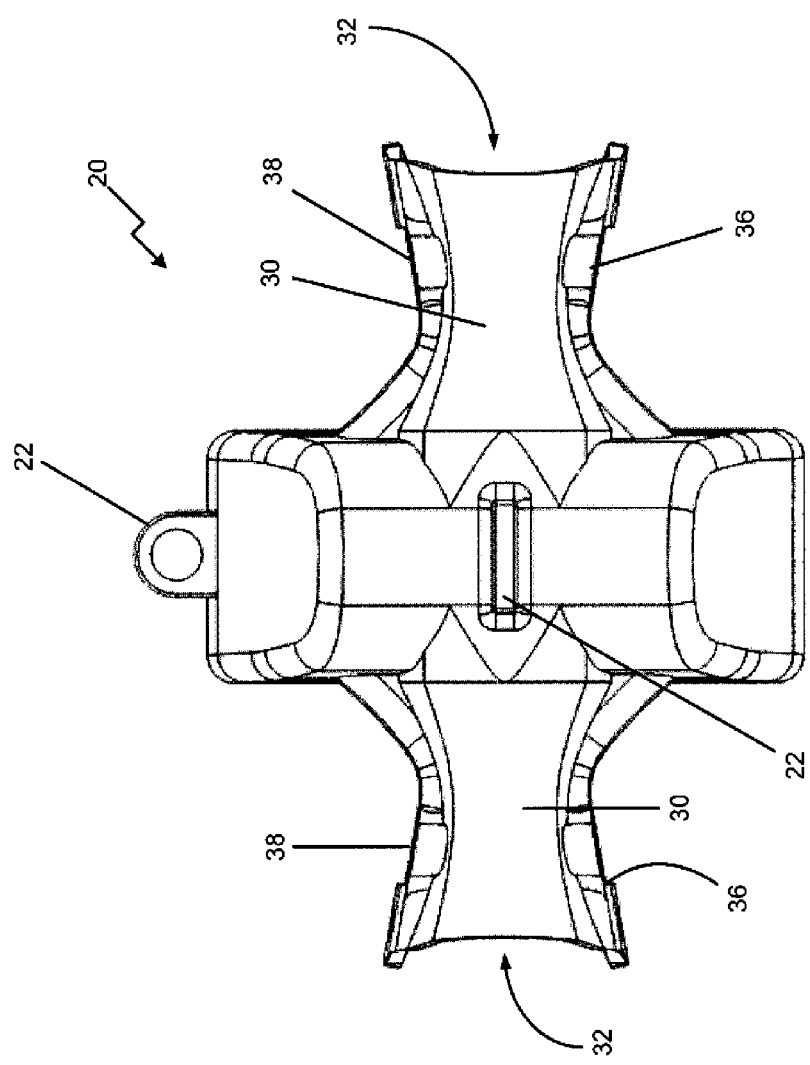
FIG. 3 is a top view illustration of the center cover member of the conductor cover apparatus of FIG. 1, in accordance with the first exemplary embodiment of the present disclosure.

FIG. 3 is a top view illustration of the center cover member 20 of the insulator cover apparatus 10 of FIG. 1, in accordance with the first exemplary embodiment of the present disclosure. The arm connectors 30 may be positioned diametrically opposite of one another or on either side of the center cover member 20, which allows the arm connectors 30 to be positioned over the portions of the conductor that are proximate to the insulator when the center cover member 20 is placed on the insulator. As is described in U.S. patent application Ser. No. 13/895,934, the universal vise-top insulator may support the conductor in an offset position, where the conductor is positioned to the side of a central axis of the insulator. Accordingly, when the center cover member 20 is positioned on the insulator, the central axis of the insulator may be offset from a center of the center cover member 20, thereby allowing the conductor itself to be positioned through each arm connector 30 and approximately through the center of the center cover member 20. To accommodate universal installations of the apparatus 10 on the insulator having either a left-hand or right-hand conductor run, the center cover member 20 may have a width that allows for the insulator to be positioned in the interior cavity on either side of the center cover member 20. As an example, FIG. 1 depicts the insulator positioned within the interior cavity of the center cover member 20 on its left side. Thus, the center cover member 20 can be positioned on the insulator without the need to rotate or orient it due to the mounting positioning of the conductor on the insulator.

The center cover member 20 may include at least one hot stick installation feature 22, which is used to install the center cover member 20 either with a hot stick or with a lineman's gloved hand. The installation feature 22 may be a circular feature which protrudes from the body of the center cover member 20 in a variety of directions. For example, as is shown in FIG. 3, the installation feature 22 may be positioned on an upper exterior, horizontal surface of the center cover member 20 and protrude vertically upwards, or it may be positioned on an exterior, vertical side of the center cover member 20 and protrude laterally from the body of the center cover member 20. Other positions of the installation feature 22 may also be included.

As is shown in FIG. 3, the arm connectors 30 may have a flared design, wherein the edges of the arm connectors 30 proximate to the openings 32 have a greater distance between the sidewalls, for example, the first external side 36 and the second external side 38, than the distance between the two sidewalls at a more interior location on the arm connectors 30. The flared edges of the arm connectors 30 may have angles of up to 30 degrees and provide appropriate clearance around the extension arm 50 (FIGS. 1-2) when it is connected to the arm connector 30 and positioned inside the arm connector 30. As the extension arm 50 is moved or positioned at varied angles relative to the arm connector 30, the flared edges of the arm connector 30 will prevent obstruction of movement of the extension arms 50. Thus, the flared edges of the arm connector 30, in combination with the open bottom and upper clearance (FIG. 1) of the arm connector 30, allow for the angular movement or positioning of the extension arm in 360° or radially about an elongated axis of the arm connector 30.

Figure 4:
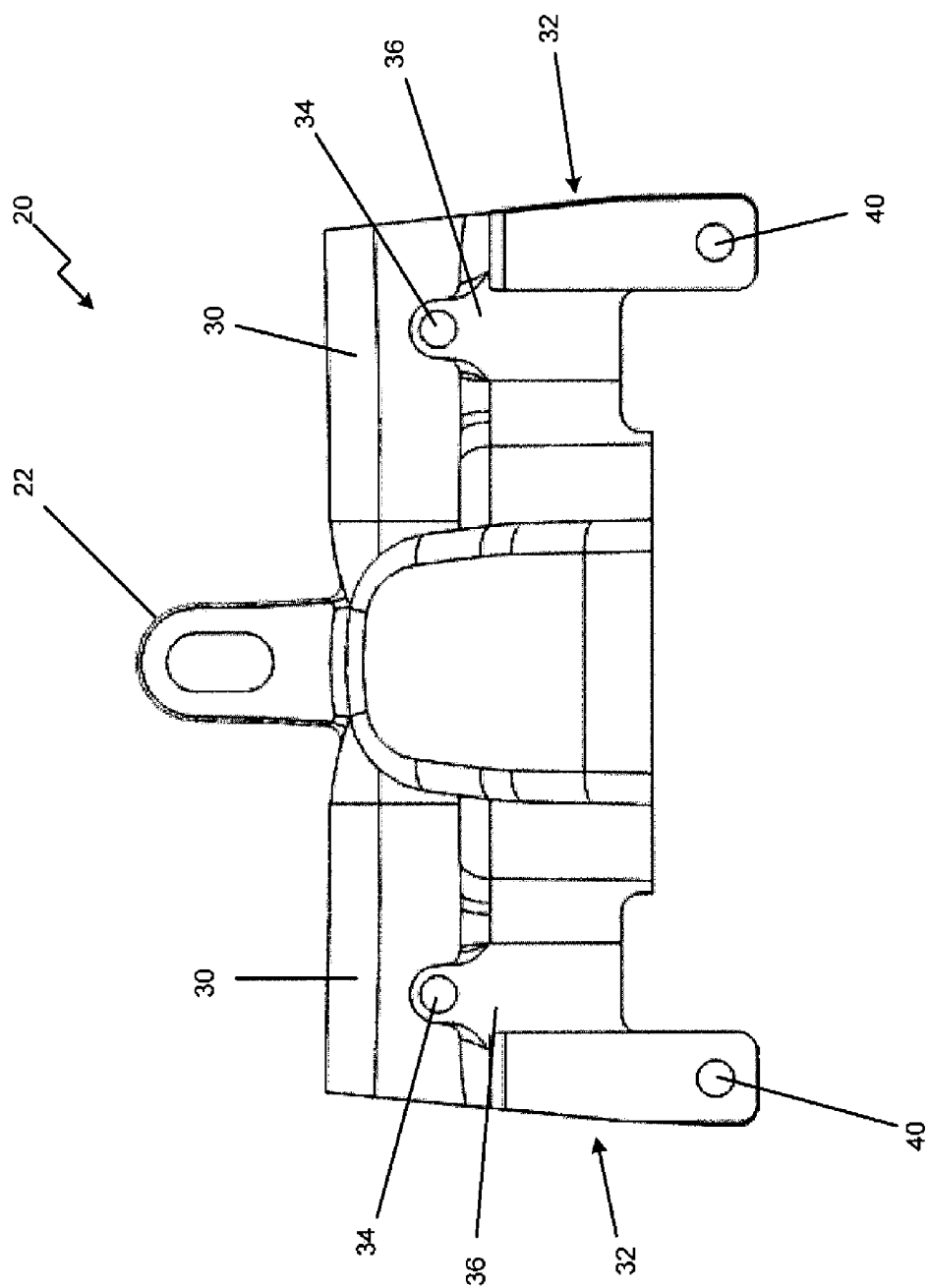
FIG. 4 is a first front view illustration of the center cover member of the conductor cover apparatus of FIG. 1, in accordance with the first exemplary embodiment of the present disclosure.

FIG. 4 is a first front view illustration of the center cover member 20 of the insulator cover apparatus 10 of FIG. 1, in accordance with the first exemplary embodiment of the present disclosure. With reference to FIGS. 1-4, the arm connectors 30 each have a first hole 34 positioned between a first external side 36 and a second external side 38. The first hole 34 may receive a pin 70 to connect the extension arms 50 (FIGS. 1-2) to the arm connector 30, thereby creating the free articulating joint allowing movement in 2 axis between the arm connector 30 and the extension arm 50 of the apparatus 10. This important feature allows a single apparatus 10 design to accommodate tangent and angled uses. The arm connector 30 also has second hole 40 which is positioned on a bottom portion of the sidewalls having the first and second external sides 36, 38. The second hole 40 may be positioned closer to the opening 32 than the first hole 34. The exact positioning of the second holes 40 may be on a tab that extends downward from the main body of the arm connector 30, as is shown in FIG. 4. The second holes 40 may be used to receive pins 70 for securing the arm connector 30 to the insulator and/or the conductor.

FIG. 5 is an isometric view illustration of the extension arm 50 of the insulator cover apparatus 10 of FIG. 1, in accordance with the first exemplary embodiment of the present disclosure. As is shown in FIG. 5 but with reference to FIGS. 1-4, the extension arm 50 has a body 54 having a conductor channel 56 and a vertical ridge 58 connected to the top of the body 54. The first arm hole 52 is positioned through the vertical ridge 58, and multiple first arm holes 52 may be included, such as at least two first arm holes 52 positioned on each extremity of the extension arm 50 in the vertical ridge 58. Additional first arm holes 52 may be provided in the vertical ridge 58 of the arm extension 50 to provide more hot stick grab points for longer extension arms 50. While the size of the first arm holes 52 may vary, it is envisioned that the first arm holes 52 can be approx. 0.6" in diameter and formed fully through the vertical ridge 58. The first arm holes 52 are intended to serve at least two purposes: (1) to create the 360° free articulating joint between the arm connector 30 and the extension arms 50 on both side of the center cover member 20, and (2) to be used as a grab point for installation with a hot stick. Other utilities of the first arm holes 52 may also exist, all of which are considered within the scope of the present disclosure.

The vertical ridge 58 may have a variety of sizes, such as having an approx. height of 1 inch and a length that is substantially the same as the arm extension 50. The height of the vertical ridge 58 may provide an increased leakage distance to the bare energized conductor or conductor positioned within the conductor channel 56 interior of the body 54. Further, the size and shape of the vertical ridge 58 may make it an uncomfortable resting site to large birds, thereby reducing the risk of electrocution of the birds. The extension arm 50 may also include second arm holes 60 which are positioned on the lower part of body 54. Any number of second arm holes 60 may be included. The second arm holes 60 may receive pins therein to aid in the ability and durability of the extension arm 50 to retain the conductor within the conductor channel 56. The extension arm 50 may be symmetrical along its elongated axis to render installation of the extension arm 50 user friendly.

Figure 7:
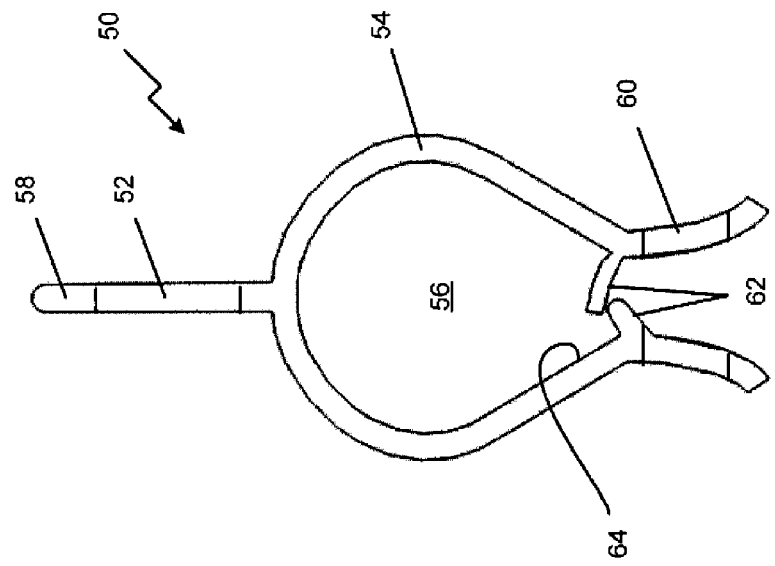
FIG. 7 is a cross-sectional side view illustration of the extension arm of the conductor cover apparatus of FIG. 5, in accordance with the first exemplary embodiment of the present disclosure.
Figure 6:
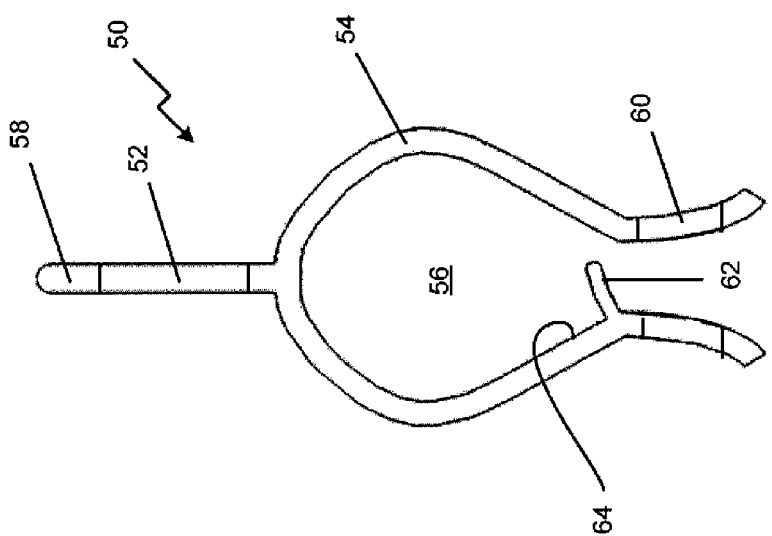
FIG. 6 is a cross-sectional side view illustration of the extension arm of the conductor cover apparatus of FIG. 5, in accordance with the first exemplary embodiment of the present disclosure.

FIG. 6 is a cross-sectional side view illustration of the extension arm 50 of the insulator cover apparatus 10 of FIG. 5, in accordance with the first exemplary embodiment of the present disclosure. FIG. 7 is a cross-sectional side view illustration of the extension arm of the insulator cover apparatus 10 of FIG. 5, in accordance with the first exemplary embodiment of the present disclosure. FIGS. 6-7 depict that extension arm 50 having a body 54 with an omega-shaped (Ω) cross-section with the vertical ridge 58 connected to a top thereof. The omega-shaped cross-section provides an elongated cavity forming the conductor channel 56 with a closed top portion and a lower portion where each side of the body 54 are positioned close together to each other, thereby providing a narrow passage therebetween. The lower portion may have the second arm holes 60 and may also include at least one flapper 62 connected to an interior surface 64 of the body 54. The flapper 62 may define an edge of the conductor channel 56, in that the flapper 62 may be preferably in an upward orientation and may prevent the conductor from being removed from the conductor channel 56 inadvertently. The flapper 62 may be optimally sized to ease installation and increase conductor retention for any range of conductors.

One, two or more flappers 62 may be included with the extension arm 50. FIG. 6 depicts the extension arm 50 with one flapper 62, whereas FIG. 7 depicts the extension arm 50 with two flappers 62, each connected to the interior surface 64 of the body 54. When two flappers 62 are present, they may be positioned substantially opposing one another on the interior surface 64 of the body 54. The two flappers 62 may be in removable contact with one another too, thereby preventing the conductor from being removed from the conductor channel 56 inadvertently. When two flappers 62 are present, they may both define the lower edge of the conductor channel 56. This design may be preferable to a single flapper 62 for ease of installation and increased retention of conductors depending on size of conductor.

In use, the lower portion of the body 54 may have a flared entrance, e.g., at the bottom portion of the omega shape, to assist with guiding the conductor or bare wire to enter the conductor channel 56 of the extension arm 50. The flapper 62 or flappers 62 affixed to the interior surface 64 of the body 54 may be bent or flared upwards towards the conductor channel 56, which may aid in allowing the conductor to pass through the narrow passage, past the flapper 62 or flappers 64, and into the conductor channel 56. When the conductor is passed by the flappers 64, they may bend or deform slightly. Once the conductor is inside the conductor channel 56, the flapper 62 or flappers 62 may spring back to their original, nonbiased positions. The flappers 62 may prevent the conductor from becoming dislodged from the conductor channel 56 during rough conditions such as high wind, hurricanes, snow storm, conductor galloping, and conductor swinging, among others. Additionally, after the conductor is within the conductor channel 56, the pins 70 (FIGS. 1-2) can be positioned through second arm holes 60 under the conductor, preferably below the flapper(s), to help restrict movement and dislodging of the conductor from the extension arm 50 during unsteady conditions, adding extra security beyond the flappers 62.

Figure 8:
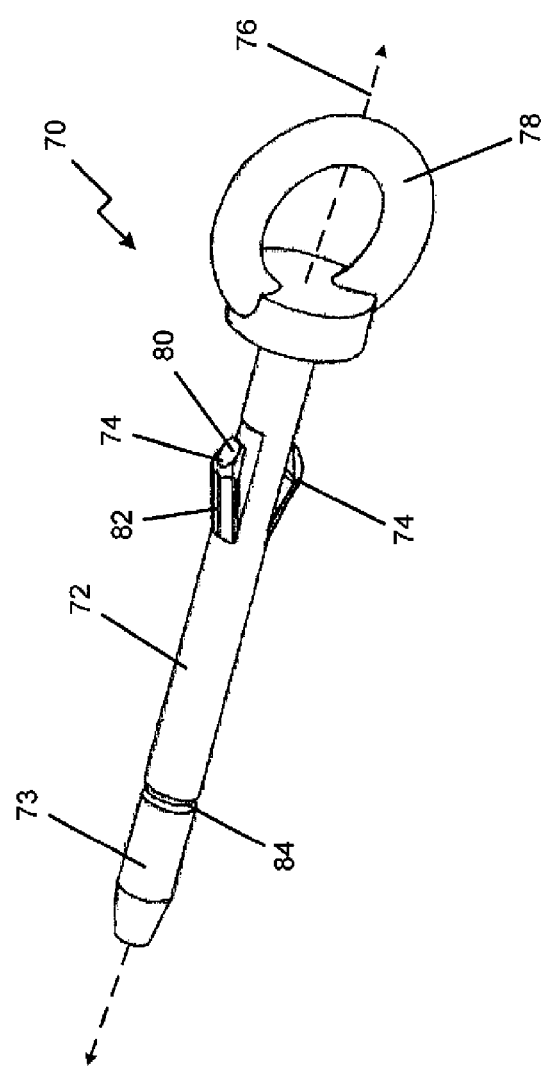
FIG. 8 is an isometric view illustration of the pin of the conductor cover apparatus of FIG. 1, in accordance with the first exemplary embodiment of the present disclosure.

FIG. 8 is an isometric view illustration of the pin 70 of the insulator cover apparatus 10 of FIG. 1, in accordance with the first exemplary embodiment of the present disclosure. The pin 70 may include a pin shaft 72 terminating at a pin tip 73. At least one collapsible prong 74 may be formed along the pin shaft 72. Two collapsible prongs 74 are shown in FIG. 8, wherein both are collapsible towards a central axis 76 of the pin shaft 72. A loop 78 may be connected to the pin shaft 72 at an end of the pin shaft 72 opposing the pin tip 73. The loop 78 may be used with a hot stick to install or remove the pin 72 while maintaining a safe distance from energized parts of the electrical system during installation and removal. The two collapsible prongs 74 may be located diametrically opposite on the pin shaft 72. The collapsible prongs 74 may be flexible to allow for collapsing into a slot within the pin shaft 72.

Further, each collapsible prong 74 may have a design with first and second sloped edges 80, 82 that are positioned in opposite directions along the longitudinal to the axis 76 of the pin 70. The first sloped edge 82 (front side) of the collapsible prong 74 may collapse as the pin 70 is inserted through a hole within the arm connector 30 or extension arm 50 (FIGS. 1-2), such as during installation. The second sloped edge 80 (back side) of the collapsible prong 74 may have a steeper angle than the first sloped edge 82, which may aid in controlling retrieval of the pin 70, namely to prevent the pin 70 from coming out inadvertently in the field. However, when a lineman exerts some pulling force on the loop 78 of the pin 70, the collapsible prongs 74 may retract towards the pin shaft 72, allowing for movement of the pin 70. The collapsible prongs 74 may be located closer to the loop 78 than to the pin tip 73 for ease of installation with a hot stick. The pin 70 may also have a circular groove 84 formed in the pin shaft 72 to allow the lineman to reduce the length of the pin 70 if deemed necessary when engaging the holes of the extension arm 50 (FIGS. 1-2).

With reference to FIGS. 1-8, the apparatus 10 may allow for at least two methods of installation: (1) assembly on the utility pole one component at a time; or (2) pre-assembly of the center cover member 20, the arm connectors 30, and two extension arms 50, and then installation of the pre-assembled components on the utility pole. In contrast, conventional wildlife covering devices do not offer this installation flexibility, as they are either installed as procured from the supplier or require pre-assembly before mounting them on the insulator and the bare conductor.

When the apparatus 10 is installed directly on the utility pole, the center cover member 20 is placed on the insulator 14 then two pins 70 are inserted in the second holes 40 of the arm connector 30 to secure it to the insulator 14. Next, the extension arm 50 is placed on the conductor 12 and pushed down on the conductor 12 until the conductor 12 occupies the conductor channel 56. Full installation of the extension arm 50 on the conductor 12 may require tapping down on the extension arm 50, especially when dealing with larger conductor sizes. The extension arm 50 may have a symmetrical design allowing the lineman to use either side. The lineman then horizontally taps the side of the extension arm 50 to push it inside the flared edges of the arm connector 30. At the bottom of the flared edge, the vertical wall 42 may be present to act as a hard stop for the extension arm 50. Once the extension arm 50 hits the vertical wall 42, the first hole 34 in the arm connector 30 and the first arm hole 52 within the vertical ridge 58 of the extension arm 50 will automatically align. Hence, the pins 70 can be easily inserted through the first hole 34 and first arm hole 52 to ensure the pivoting connection between the arm connector 30 and the extension arm 50. Lastly, for extra security, pins 70 can also be inserted in the second arm holes 60 of the extension arms 50 to ensure the conductor 12 remains within the conductor channel 56.

When the apparatus 10 is pre-assembled before installation on the utility pole, the extension arm 50 may be entered in the flared edges of the arm connector 30 until it hits the vertical stop 42. The first hole 34 in the arm connector 30 and the first arm hole 52 within the vertical ridge 58 of the extension arm 50 align and the pins 70 are inserted to connect the extension arm 50 to the arm connector 30. The assembly is then picked up, placed on the insulator 14 and the extension arms 50 are pushed down onto the conductor 12, placing the conductor 12 within the conductor channel 56. Pins 70 may then be inserted in second holes 40 of the arm connectors to secure the apparatus 10 to the insulator 14, and to holes 60 within the extension arm 50 to secure the extension arm 50 to the conductor 12.

Both installation methods, direct and pre-assembly, may be performed by hand (glove) or by use of a hot stick. There are several features of the apparatus 10 designed specifically to ease installation when using a hot stick. For example, the center cover member 20 includes hot stick installation features 22, such as a side and top hot stick installation feature 22. The side hot stick installation feature 22 provides the lineman with options to easily install the center cover member 20 from locations below or level with the insulator 14 and conductor 12. A top attachment hot stick installation feature 22 provides options to easily install the center cover member 20 from locations above or level with the insulator 14 and conductor 12. The extension arms 50 feature first holes 52 on the vertical ridge 58 which are preferably sized to about 0.6" in diameter to provide a free articulation joint with the arm connector 30 and also to serve as an attachment point for a hot stick during installation. The pin 70 also has loop 78 which is preferably sized to about 0.8" in diameter to serve as an attachment point for a hot stick during installation. In contrast to conventional pins, the collapsible prongs 74 on pin 70 are located towards the rear end of the pin 70 and not close to the pin tip 73, which aids in the insertion of the pin 70 in a hole when using a hot stick. Specifically, the position of the collapsible prongs 74 on the pin 70 allows the pin 70 to be inserted through all parts of a hole, e.g., the first hole 34 on both sidewalls of the arm connector 30, before the collapsible prongs 74 bend and pass through the initial hole on the sidewall entered. Once the collapsible prongs 74 spring back into their original position, the pin 70 may be secured in place. Thus, premature locking of the collapsible prongs 74 during installation of the pin 70 can be prevented. For all the assembly components described herein, a hot stick can be used to make secure attachments using only its standard end-of-arm hook. This means that no additional tools or accessories are required to install the cover assembly.

As discussed previously, the ability of the apparatus 10 to provide angular positioning and movement of the extension arms 50 relative to the arm connectors 30 allows the apparatus 10 to be used independent of any inherent flexibility of the material used to construct the extension arms 50 and arm connectors 30. In contrast, conventional devices depend on the material's flexibility to ensure bending or flexing of the device when dealing with angled construction configurations. While the apparatus 10 does not require inherent material flexibility, it is possible for virtually any electrical grade plastic resin to be used in the manufacturing of the components of the apparatus 10. For example, the components may be formed from High Density Polyethylene HDPE; Linear Low Density Polyethylene LLDPE; Polypropylene PP; Ethylene Vinyl Acetate EVA; Polyvinyl Carbonate PVC; EPDM rubber; Silicone, or other materials. However, it is advantageous for the plastic resin selected for component construction to be UV stabilized to resist the harsh impact of these radiations on the material for a few decades. Furthermore, the mechanical/physical qualities (tensile strength, elongation %, etc.) of the resin should be adequate so that the material can resist the stresses during installation, insertion/removal of the pins 70 and the bending, the flexing and the pulling forces undergone by the apparatus 10 during unsteady conditions over a long period of time. Additionally, the apparatus 10 should withstand the long term mechanical and vibration solicitations from wind, storms, ice, snow, and other conditions.

The specific construction of the apparatus 10, including material thickness, external profile and the location of the free articulating joint are designed to meet the test requirements described in IEEE Std 1656-2010, IEEE Guide for Testing the Electrical, Mechanical, and Durability Performance of Wildlife Protective Devices on Overhead Power Distribution Systems Rated up to 38 kV. The apparatus 10 is designed to provide positions of the free articulating joint that are a critical distance from the energized conductor in order to minimize the risk of electrocution to wildlife. This critical distance is the shortest path measured from the external edge of the first hole 34 of the arm connector 30 to the conductor 12, which is preferably not less than 1.75 inches. The distance can be changed by modifying the pivoting location of the extension arm 50 with respect to the insertion depth into the arm connector 30, the first arm hole 52 diameter, the profile and material thickness of the extension arm 50, and the through-hole depth of the first hole 34 of the arm connector 30. Other possible embodiments may include profiles, thicknesses, vertical ridge width or similar geometries to achieve a larger critical distance suited for higher voltage applications, for example 69 kV, 115 kV or higher. Other modifications and variations of the present invention are possible in light of the above teachings, all of which are considered within the scope of the present disclosure.

Figure 9:
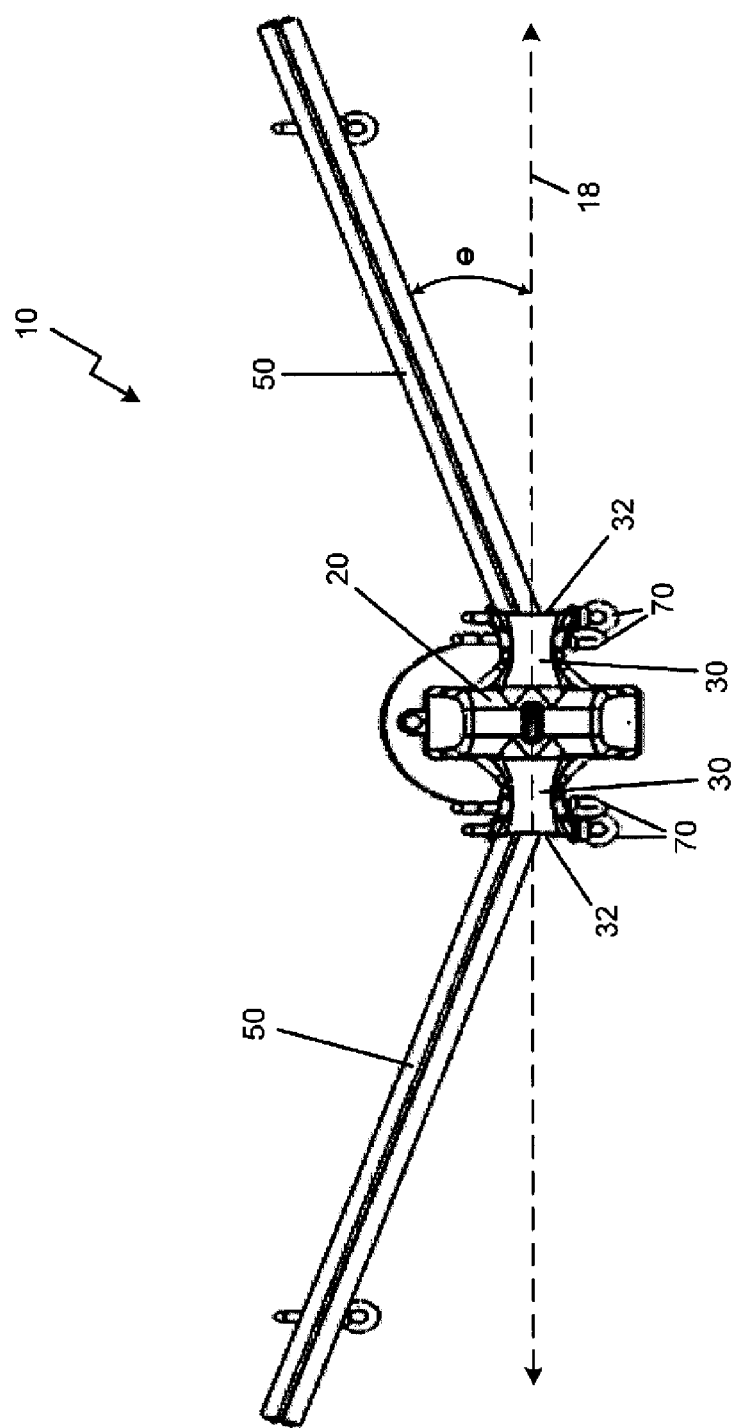
FIG. 9 is a top view illustration of the conductor cover apparatus of FIG. 1 with two extension arms in a horizontal angled position, in accordance with the first exemplary embodiment of the present disclosure.

FIG. 9 is a top view illustration of the insulator cover apparatus 10 of FIG. 1 with two extension arms 50 in a horizontal angled position, in accordance with the first exemplary embodiment of the present disclosure. Specifically, the apparatus 10 is depicted in use on an angled conductor construction with the center cover member 20 positioned over an insulator. The gap between the lateral flared edges of the arm connector 30 at the opening 34 and the extension arm 50 around the joint formed by pin 70 through first hole 34 and first arm hole 52 (FIGS. 1-2) may allow an angle, θ, with a vertical plane 18. The angle, θ, may be up to 15° relative to the vertical plane 18. In different embodiments of the apparatus 10, increasing the spatial gap and the flared angle of the arm connector 30 at the opening 34 may allow an angle θ of up to about 30° with the vertical plane 18. The angle θ of FIG. 9 reflects half of the maximum line construction angle for which the conductor may be installed. The angle θ of FIG. 9 may be larger than the typical lateral angular position of angled conductor construction, thus allowing for movement that the conductor may experience in inclement weather situations.

Figure 10:
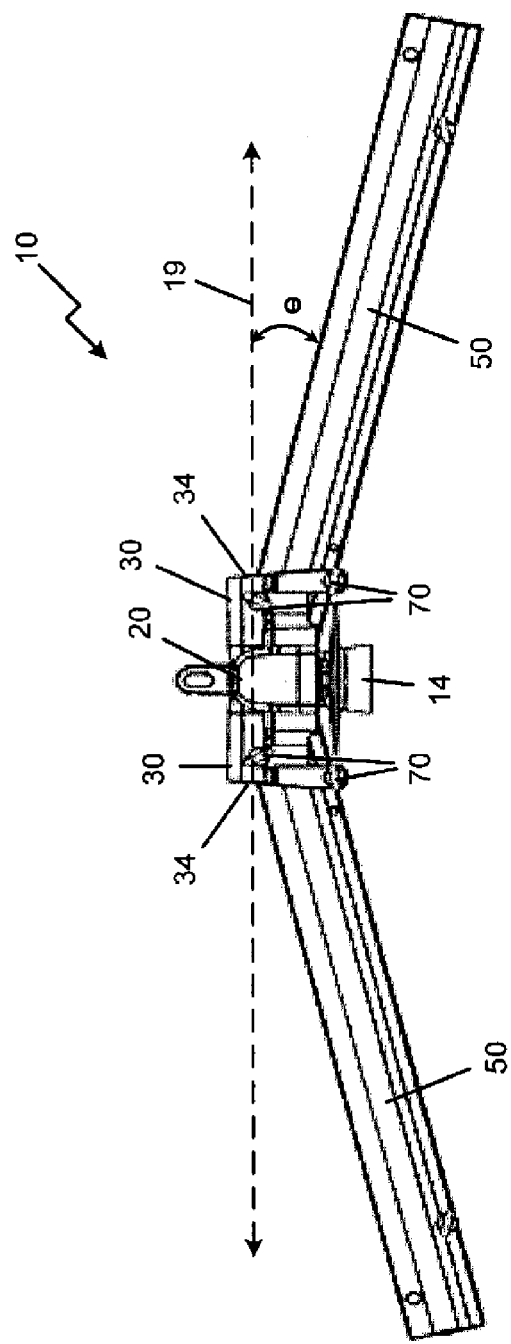
FIG. 10 is a front view illustration of the conductor cover apparatus of FIG. 1 with two extension arms in a downward vertical angled position, in accordance with the first exemplary embodiment of the present disclosure.

FIG. 10 is a front view illustration of the insulator cover apparatus 10 of FIG. 1 with two extension arms 50 in a downward vertical angled position, in accordance with the first exemplary embodiment of the present disclosure. The apparatus 10 is shown in use with the center cover member 20 positioned on an insulator 14. The gap between the lateral flared edges of the arm connector 30 at the opening 34 and the extension arm 50 around the joint formed by pin 70 through first hole 34 and first arm hole 52 (FIGS. 1-2) may allow an inclination angle, θ, with a horizontal plane 19 or horizon. The inclination angle, θ, may be up to 15° or greater than 15° relative to the horizontal plane 19. The 15° inclination angle θ illustrated in FIG. 10 may be representative of the angle that the conductor sags due to the line tension level and to the conductor temperature which varies with circuit loads and ambient conditions.

Figure 11:
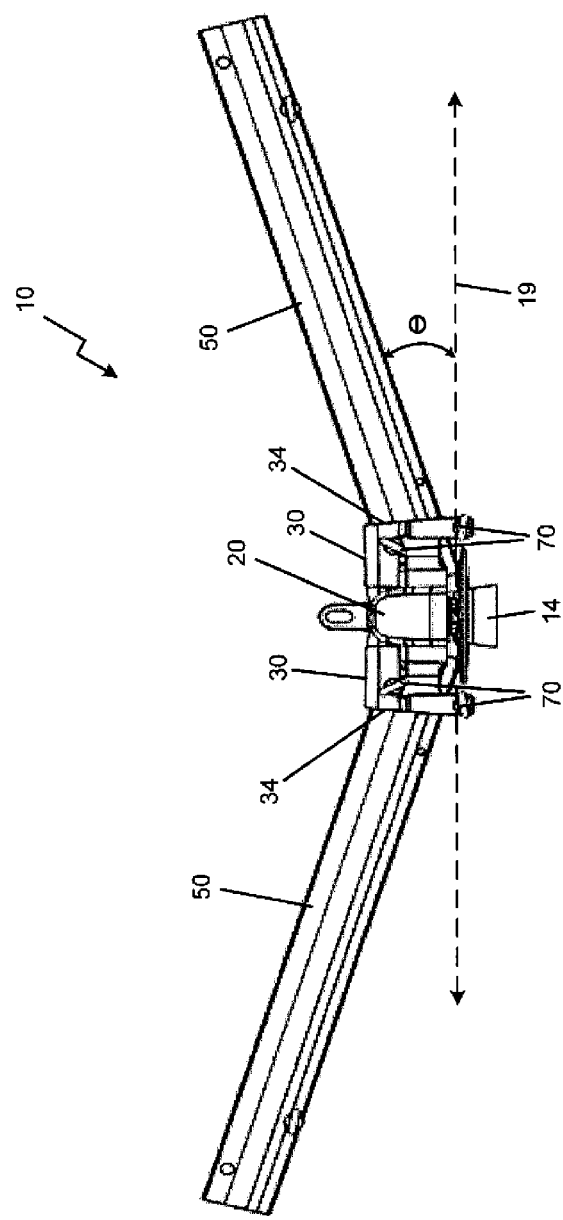
FIG. 11 is a front view illustration of the conductor cover apparatus of FIG. 1 with two extension arms in an upward vertical angled position, in accordance with the first exemplary embodiment of the present disclosure.

FIG. 11 is a front view illustration of the insulator cover apparatus 10 of FIG. 1 with two extension arms 50 in an upward vertical angled position, in accordance with the first exemplary embodiment of the present disclosure. The apparatus 10 is shown in use with the center cover member 20 positioned on an insulator 14. The gap between the ceiling or top of the flared edges of the arm connector 30 at the opening 34 and the extension arm 50 around the joint formed by pin 70 through first hole 34 and first arm hole 52 (FIGS. 1-2) may allow the extension arm 50 to move upward around the free articulating joint by an inclination angle θ of up to about 15 degrees relative to the horizontal plane 19. In other embodiments, other inclination angles θ may be accounted for by adjusting the flared edges of the arm connector 30. The 15° inclination angle θ illustrated in FIG. 11 may be representative of the angle that the conductor experiences due to the varied elevations of utility poles, as well as conductor galloping and movement during inclement weather.

In practice, a combination of at least two or three of the angular configurations depicted in FIGS. 9-11 may be employed. These combinations can be normal to the application due to the terrain elevation, construction configuration (tangent or angled) and the line tension. Furthermore, occasionally, inclement weather conditions such as wind, rain, or snow may cause line galloping, line blow-out, or tree falling on the conductor. These conditions can induce an unsteady state in the conductor, triggering erratic movements. The apparatus 10 is designed to adapt to these erratic movements and hence move in harmony with the conductor without risking stressing the apparatus 10 or dislodging it, which is provided in large part to the ability of the extension arm 50 to have angular position relative to the arm connector 30 in 360° about the arm connector 30, permitted by the free articulating joint.

Figure 12:
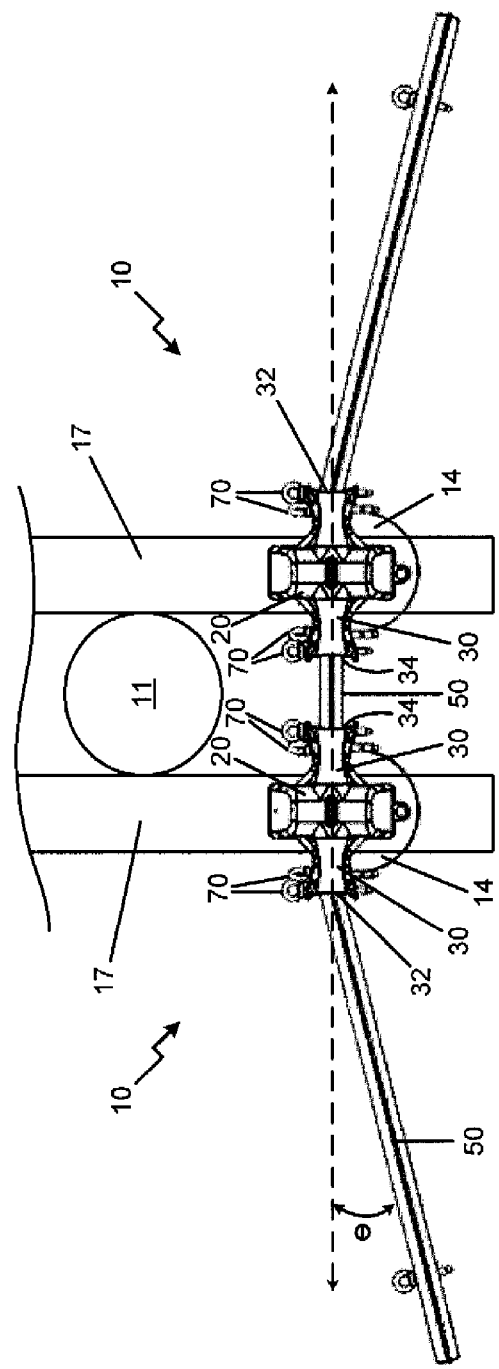
FIG. 12 is a top view illustration of the conductor cover apparatus of FIG. 1 in a double cross-arm construction configuration in a horizontal angled position, in accordance with the first exemplary embodiment of the present disclosure.

FIG. 12 is a top view illustration of the insulator cover apparatus 10 of FIG. 1 in a double cross-arm construction configuration in a horizontal angled conductor position, in accordance with the first exemplary embodiment of the present disclosure. The configuration of FIG. 12 is generally utilized by linemen in the field when the line angle exceeds 15°. The insulators 14 are installed on their respective cross-arm 17 which are mounted on the utility pole 11. The center cover member 20 is placed on each insulator 14. The extension arms 50 are used to cover the conductor between both insulators 14 and will either be cut to size by the lineman or pre-cut to size by the supplier. Pins 70 are used to connect the extension arm 50 to the center cover members 20 via a hole, as discussed previously. The extension arms 50 are connected to the center cover member 20 as previously described and therefore have the 360° free articulating joint with inclination angles up to about 30° in all directions.

The apparatus can also be used with other possible embodiments and applications using different types of insulators such as tie-top pin insulator, tie-top line post insulator, vise-top line post insulator, clamp-top line post insulator or station post insulator.

FIG. 13 is a flowchart illustrating a method of shielding overhead electrical transmission and distribution components from wildlife contact, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, an electrical transmission and distribution conductor, where affixed to an insulator, is shielded from a vertical position with a center cover member. A portion of an electrical transmission and distribution conductor affixed to an insulator is shielded from the vertical position with at least one arm connector formed on the center cover member, the at least one arm connector having an opening and a first hole positioned between a first external side and a second external side of the at least one arm connector, and an extension arm positioned at least partially interior of the first and second external sides of the at least one arm connector, wherein the extension arm is movably connected to the at least one arm connector with at least one pin, wherein the at least one pin is positioned through the first hole of the at least one arm connector and a second hole within the extension arm (block 104). The method may further include any of the processes, steps, functions, or structures disclosed relative to FIGS. 1-12 herein.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A conductor cover apparatus for use with an overhead electrical transmission and distribution system, the conductor cover apparatus comprising:
   a center cover member;
   at least one arm connector formed on the center cover member, the at least one arm connector having an opening and a first hole traversing a first external side and a second external side of the at least one arm connector;
   an extension arm positioned at least partially interior of the first and second external sides of the at least one arm connector; and
   at least one pin removably connecting the extension arm to the at least one arm connector, wherein the at least one pin is positioned through the first external side and the second external side of the at least one arm connector and a first arm hole within the extension arm.

2. The conductor cover apparatus of claim 1, wherein the at least one pin removably connecting the extension arm to the at least one arm connector is a freely articulating joint.

3. The conductor cover apparatus of claim 2, wherein the freely articulating joint allows at least a 30 degree position of the extension arm in any direction.

4. The conductor cover apparatus of claim 1, wherein the extension arm further comprises:
   a body having a conductor channel, wherein the body has an omega-shaped cross-section; and
   a vertical ridge connected to a top of the body, wherein the vertical ridge is planar, and wherein the first arm hole is formed in the vertical ridge.

5. The conductor cover apparatus of claim 4, further comprising at least a second hole formed in the body, wherein the second hole is formed between a first external side and a second external side of the body.

6. The conductor cover apparatus of claim 5, further comprising a second pin removably positioned within the second hole formed in the body.

7. The conductor cover apparatus of claim 4, further comprising at least one flapper connected to an interior surface of the body, wherein the at least one flapper defines an edge of the conductor channel.

8. The conductor cover apparatus of claim 7, further comprising at least two flappers, each connected to the interior surface of the body, wherein the at least two flappers are positioned substantially opposing one another, wherein the at least two flappers are in removably contact with one another, wherein the at least two flappers define an edge of the conductor channel.

9. The conductor cover apparatus of claim 8, wherein at least one of the two flappers extends upwards towards the conductor channel.

10. The conductor cover apparatus of claim 1, further comprising at least one hot stick installation feature, wherein the at least one hot stick installation feature is positioned on at least one of:
    an upper exterior surface of the center cover member; and
    an exterior, vertical side of the center cover member.

11. The conductor cover apparatus of claim 1, wherein the at least one pin further comprises:
    a pin shaft terminating at a pin tip;
    at least one collapsible prong formed along the pin shaft, wherein the at least one collapsible prong is collapsible towards a central axis of the pin shaft; and
    a loop connected to the pin shaft.

12. A system for shielding overhead electrical transmission and distribution components from wildlife contact, the system comprising:
    an electrical transmission and distribution conductor affixed to an insulator;
    a center cover member shielding a conductor—insulator interface from a vertical position;
    at least one arm connector formed on the center cover member, the at least one arm connector having an opening and a first hole traversing a first external side and a second external side of the at least one arm connector, wherein the at least one arm connector at least partially shields a first portion of the electrical transmission and distribution conductor from the vertical position;
    an extension arm positioned at least partially interior of the first and second external sides of the at least one arm connector, wherein the extension arm at least partially shields a second portion of the electrical transmission and distribution conductor from at least the vertical position; and
    at least one pin removably connecting the extension arm to the at least one arm connector, wherein the at least one pin is positioned through the first external side and the second external side of the at least one arm connector and a first arm hole within the extension arm.

13. The conductor cover apparatus of claim 12, wherein the at least one pin removably connecting the extension arm to the at least one arm connector is a freely articulating joint.

14. The conductor cover apparatus of claim 13, wherein the freely articulating joint allows at least a 30 degree position of the extension arm relative to a non-angled axis of the at least one arm connector.

15. The conductor cover apparatus of claim 12, wherein the extension arm further comprises:
    a body having a conductor channel, wherein the second portion of the electrical transmission and distribution conductor is positioned within the conductor channel, wherein the body has an omega-shaped cross-section; and
    a planar vertical ridge connected to a top of the body.

16. The conductor cover apparatus of claim 15, further comprising at least one flapper connected to an interior surface of the body, wherein the at least one flapper defines an edge of the conductor channel.

17. A method of shielding overhead electrical transmission and distribution components from wildlife contact, the method comprising the steps of:
    shielding an electrical transmission and distribution conductor—insulator interface from a vertical position with a center cover member; and
    shielding a portion of an electrical transmission and distribution conductor affixed to an insulator from the vertical position with at least one arm connector formed on the center cover member, the at least one arm connector having an opening and a first hole positioned between a first external side and a second external side of the at least one arm connector, and an extension arm positioned at least partially interior of the first and second external sides of the at least one arm connector, wherein the extension arm is movably connected to the at least one arm connector with at least one pin, wherein the at least one pin is positioned through the first external side and the second external side of the at least one arm connector and a first arm hole within the extension arm.

18. The method of claim 17, further comprising positioning the arm extension at an angle relative to the at least one arm connector, wherein the angle is substantially between 0 degrees and 30 degrees.

19. The method of claim 17, further comprising shielding the portion of an electrical transmission and distribution conductor within a conductor channel of the extension arm, wherein the conductor channel is positioned within a body of the extension arm, wherein the body has an omega-shaped cross-section.

20. The method of claim 19, further comprising retaining the portion of the electrical transmission and distribution conductor within the conductor channel with at least one flapper connected to an interior surface of the body.

* * * * *